United States Patent
Sekiguchi et al.

(10) Patent No.: US 7,742,478 B2
(45) Date of Patent: Jun. 22, 2010

(54) REPLY COMMUNICATION APPARATUS AND ARP REPLY COMMUNICATION APPARATUS

(75) Inventors: Akihiro Sekiguchi, Tsuchiura (JP); Koichiro Seto, Inashiki-gun (JP)

(73) Assignee: Hitachi Cable, Ltd., Chiyoda-ku, Tokyo (JP)

(*) Notice: Subject to any disclaimer, the term of this patent is extended or adjusted under 35 U.S.C. 154(b) by 706 days.

(21) Appl. No.: 11/543,936

(22) Filed: Oct. 6, 2006

(65) Prior Publication Data

US 2007/0110068 A1 May 17, 2007

(30) Foreign Application Priority Data

Nov. 16, 2005 (JP) ............................. 2005-331394

(51) Int. Cl.
*H04L 12/56* (2006.01)
(52) U.S. Cl. ................... 370/392; 370/401; 370/389; 370/258
(58) Field of Classification Search ................ 370/389, 370/392, 258
See application file for complete search history.

(56) References Cited

U.S. PATENT DOCUMENTS

| | | | |
|---|---|---|---|
| 6,639,607 B1 * | 10/2003 | Ferguson et al. | 715/734 |
| 6,772,219 B1 * | 8/2004 | Shobatake | 709/238 |
| 2003/0009573 A1 | 1/2003 | Sumida | |
| 2005/0175018 A1 * | 8/2005 | Wong | 370/396 |
| 2006/0129695 A1 * | 6/2006 | Faibish et al. | 709/245 |
| 2007/0242698 A1 | 10/2007 | Sumida | |

FOREIGN PATENT DOCUMENTS

| | | |
|---|---|---|
| JP | 2002-208982 | 7/2002 |
| JP | 2003-018152 | 1/2003 |

OTHER PUBLICATIONS

Japanese Office Action dated Jan. 26, 2010 with an English translation.

* cited by examiner

*Primary Examiner*—Dang T Ton
*Assistant Examiner*—Pamit Kaur
(74) *Attorney, Agent, or Firm*—McGinn IP Law Group, PLLC

(57) ABSTRACT

A reply communication apparatus conforms to a protocol to return a reply electronic document in reply to a request electronic document sent from a communication apparatus. The apparatus has a hardware to perform a reply process in the protocol, and is operable to rewrite contents of the request electronic document to replace the request electronic document into a reply electronic document and to output the reply electronic document.

8 Claims, 7 Drawing Sheets

A : ARP-REQUEST-PACKET-MOUNTED FRAME
B : OTHER-PACKET-MOUNTED FRAME
A' : ARP-REPLY-PACKET-MOUNTED FRAME

FIG. 5A  51: ETHERNET HEADER  52: ARP PACKET/IP HEADER  53: DATA
RECEIVING FRAME
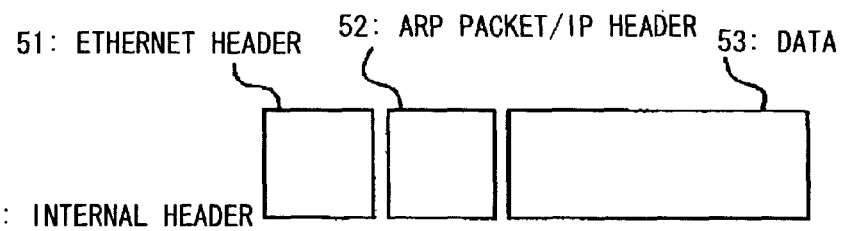
FIG. 5B  54: INTERNAL HEADER
INTERNAL PACKET $1
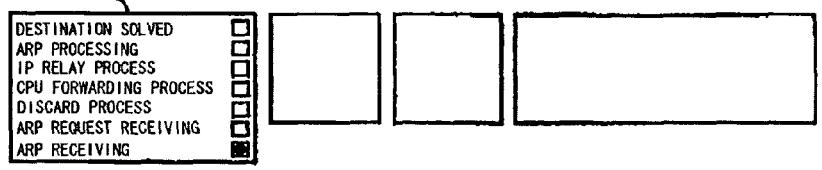
FIG. 5C
INTERNAL PACKET $2
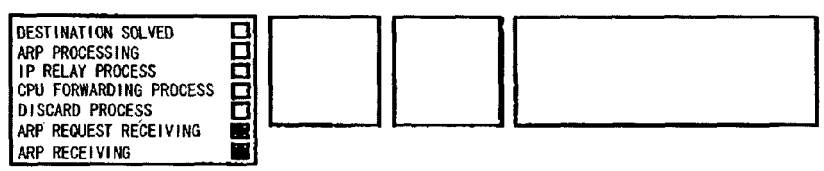
FIG. 5D
INTERNAL PACKET $3
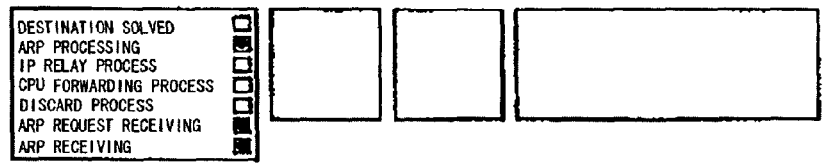
FIG. 5E
INTERNAL PACKET $4
FIG. 5F
TRANSMITTING FRAME

REPLY COMMUNICATION APPARATUS AND ARP REPLY COMMUNICATION APPARATUS

The present application is based on Japanese patent application No. 2005-331394, the entire contents of which are incorporated herein by reference.

BACKGROUND OF THE INVENTION

1. Field of the Invention

The invention relates to a communication apparatus connected to a network and a reply communication apparatus and an ARP reply communication apparatus which achieves high-speed reply.

2. Description of the Related Art

In the field of communication through a line, various protocols are regulated to respective layers of an OSI reference model, and processes related to the respective protocols are united to constitute a considerable complex process as a whole. Even though all these processes are executed by hardware, the hardware for the processes cannot be easily designed. Therefore, protocols related to layer 2 (data link layer) and higher layers except for layer 1 (physical layer) are generally executed by software.

The present invention is applied to a communication apparatus in which Ethernet (registered trademark) of the protocols is mounted. The Ethernet includes protocols related to layers 1 and 2. The protocols generally include DIX standard and IEEE802.3 standard. The two standards are generally called the Ethernet.

As protocols of layer 3 (network layer) and higher layers, TCP/IP is known. The TCP/IP is defined in a standard recommendation document RFC issued by IAB (Internet Architecture Board).

In this specification, an electronic document used in the Ethernet (belonging to layer 2) is called a frame, and an electronic document used in IP (belonging to layer 3) is called a packet. Between apparatuses on a network, the packet is transmitted while being mounted on a frame. A simple expression "packet is transmitted" from a device to a destination device is an expression made with attention to an operation of layer 3. When the operation of layer 2 is included, the expression means that "packet is mounted on a frame, and the frame is transmitted".

Furthermore, in the present invention, an internal header may be added to a frame in hardware processing. However, in this specification, frame Added with the internal header is called an internal packet.

For example, a communication apparatus 61 as shown in FIG. 6 has a PHY 62 which is connected to a line of a network and processes a frame serving as an electric signal to be input/output by layer 1, a MAC 63 which processes the frame transmitted from the PHY 62 by layer 2, a packet forwarding 64 which performs a layer 3 process with respect to a packet in the frame forwarded from the MAC 63, and a CPU 65. A process performed by the PHY 62 is called an L1 termination, a process performed by the MAC 63 is called an L2 termination, and a process performed by the packet forwarding 64 is called an L3 termination.

As one of protocols executed by the software, an address solution protocol (RFC826) called an ARP used between layer 2 and layer 3 is known. The ARP is a protocol which inquires about a destination MAC address at a destination the IP address of which is know and the MAC address is not known.

More specifically, in an ARP request packet, an operation field is set as an ARP request by an ARP request transmitting device, a self-apparatus port IP address is stored in a source IP address field, a self-apparatus port MAC address is stored in a source MAC address field, a destination IP address is stored in a destination IP address field, and a destination MAC address field is blank (i.e., 0 is stored in every field). When this ARP request packet is transmitted by broadcasting of the Ethernet, each communication apparatus on a network at which the ARP request packet arrives checks a type field in an Ethernet header and an operation field in the ARP packet to determine the ARP request packet. When the packet is an ARP request packet, the communication apparatus checks whether a self-apparatus port IP address is stored in the destination IP address field. In this manner, the communication apparatus which recognizes that the packet is an ARP request packet addressed to the apparatus itself returns an ARP reply packet.

In the ARP reply packet, an operation field is set as an ARP reply by an ARP request receiving device, a self-apparatus port IP address is stored in a source IP address field, a self-apparatus port MAC address is stored in a source MAC address field, a destination IP address is stored in a destination IP address field, and a destination MAC address is stored in a destination MAC address field. The destination IP address and the destination MAC address are the same as those stored in the ARP request packet. A communication apparatus which transmits the ARP request packet receives an ARP reply packet to make it possible to acquire a desired destination MAC address.

For example, as shown in FIG. 7, in a network in which a terminal D1 is connected to a router D serving as a connecting device (router or L3 switch) of layer 3, a terminal E1 is connected to a router E, the routers D and E are connected to a network F, and network interface cards (NIC) are incorporated in the terminals D1 and E1, when the terminal D1 serving as a communication apparatus in which ARP is mounted desires to transmit a normal frame to the terminal E1 serving as a communication apparatus on which ARP is mounted as in the terminal D1, even though the IP address of the terminal E1 is known, if the MAC address of the router D is not know, the normal frame cannot be transmitted to the router D. For this reason, the terminal D1 transmits an ARP request packet in which the IP address of the router D is stored in a destination IP address field by broadcasting of the Ethernet. Since the router D which receives the ARP request packet transmits an ARP reply packet to the terminal D1, the terminal D1 knows the MAC address of the router D to make it possible to transmit a normal frame to the router D.

Pieces of field information to be stored in the ARP request packet and the ARP reply packet are partially different from each other. However, the ARP request packet and the ARP reply packet basically have the same format. A set of the ARP request packet and the ARP reply packet is called an ARP packet.

Therefore, procedures to be executed in a communication apparatus with respect to an ARP reply will be described in classification by hardware (herein referred to as HW) and software (herein referred to as SW).

¥1. HW; All ARP packets arriving at a PHY by broadcasting are received and forwarded to a CPU.

¥2. SW; An ARP request packet is detected from the ARP packet forwarded to the CPU on the basis of an operation field.

¥3. SW; It is determined by a destination IP address field whether the detected ARP request packet is addressed to a self-apparatus port (the self apparatus has a plurality of ports, and respective ports have IP addresses, respectively).

¥4. SW; When the ARP request packet is not addressed to the self-apparatus port, the ARP request packet is discarded.

¥5. SW; When the ARP request packet is addressed to the self-apparatus port, an ARP reply packet to be transmitted is generated. The received ARP request packet is discarded.

¥6. HW; The generated ARP reply packet is transmitted from a PHY. The ARP reply packet is transmitted so as to be inserted into a flow of the packet of an internal line connected to the MAC 63. When there is another packet, the packet is temporarily stored in a packet buffer (not shown in FIG. 6), and the packet is transmitted after the ARP reply packet is transmitted.

A related art to the invention is JP-A-2002-208982.

When a communication apparatus on which an ARP is mounted receives an ARP request packet addressed to the self-apparatus, an ARP reply packet must be transmitted. However, the communication apparatus may be targeted for an attack using an ARP called a DOS attack by a malicious third party. In the DOS attack, a large number of ARP request packets are sequentially sent to the communication apparatus. The communication apparatus which receives the ARP request packets repeatedly executes the procedures ¥1 to ¥6. Since most of the processes are software processes, a load on a CPU increases to make the CPU impossible to execute other processes. As a result, the apparatus cannot receive the other packets to be essentially received, and transmission/reception of the other packets is largely delayed to insert an ARP reply packet. The ARP reply packet reaches an ARP request source in late. For this reason, a normal packet to be essentially transmitted to a reply side by the ARP request source is considerably delayed.

The above malfunction of the communication apparatus is an object of the DOS attack. However, as in not only a DOS attack, when ARP packets increase on a network, the function of the communication apparatus is deteriorated for the same reason as described above.

The present applicant conceives the following fact. That is, when a software processing part in the ARP reply procedure is replaced with hardware processing to increase a processing speed, a load on a CPU can be reduced, and the function of the communication apparatus can be prevented from being deteriorated by the DOS attack or the increase in number of ARP packets. However, even though the software processing is entirely replaced with the hardware processing, it is understood that the following problems are left unsolved. That is, a large-capacity packet buffer is disadvantageously necessary for insertion of an ARP reply packet, and control of the packet buffer is complex.

SUMMARY OF THE INVENTION

It is an object of the present invention to provide a reply communication apparatus and an ARP reply communication apparatus which solve the above problems to achieve a high-speed reply.

(1) According to one aspect of the invention, a reply communication apparatus which conforms to a protocol to return a reply electronic document in reply to a request electronic document sent from a communication apparatus comprises:

a hardware to perform a reply process in the protocol, wherein the hardware is operable to rewrite contents of the request electronic document to replace the request electronic document into a reply electronic document and to output the reply electronic document.

(2) According to one aspect of the invention, an ARP reply communication apparatus comprises:

an ARP packet determining circuit to determine whether an ARP packet is mounted on a frame based on a type field in an Ethernet header of the frame sent through a line and arriving at a port of the apparatus;

an ARP request packet determining circuit to, when it is determined that the ARP packet is mounted on the frame, determine whether the ARP packet is an ARP request packet based on an operation field in the ARP packet;

a self-apparatus destination determining circuit to, when it is determined that the ARP packet is the ARP request packet, check a destination IP address field in the ARP request packet to determine whether the ARP request packet is addressed to the self-apparatus; and a packet replacing circuit to, when it is determined that the ARP request packet is addressed to the self-apparatus, overwrite reply contents on the ARP request packet to replace the ARP request packet with an ARP reply packet, wherein the ARP packet determining circuit, the ARP request packet determining circuit, the self-apparatus destination determining circuit, and the packet replacing circuit composes an ARP reply procedure hardware.

In the above invention (2), the following modifications and changes can be made.

(i) The ARP packet determining circuit comprises an internal header adding circuit to add an internal header to each arriving frame to produce an internal packet, and an ARP packet receiving marking circuit to set an ARP packet receiving flag of the internal header when a type field in an Ethernet header of the internal packet is an ARP packet, the ARP request packet determining circuit comprises an ARP request packet receiving marking circuit to set an ARP request packet receiving flag of the internal header when a type field in the ARP packet of the internal packet is an ARP request packet, the self-apparatus destination determining circuit comprises an ARP processing execution designating marking circuit to set an ARP processing execution designating flag of the internal header when a destination IP address field in the ARP packet of the internal packet is an IP address of a self-apparatus port, the packet replacing circuit comprises an address overwriting circuit to, when the ARP packet receiving flag, the ARP request packet receiving flag and the ARP processing execution designating flag are set in the internal header of the internal packet, replace the destination IP address field in the ARP request packet of the internal packet with a source IP address field, replace a destination MAC address field with a source MAC address field, and overwrite a MAC address of the self-apparatus on the source MAC address field, and the apparatus further comprises an internal header deleting circuit to delete the internal header from the internal packet to produce a transmitting frame.

Advantages of the Invention

The invention offers the following excellent advantages:
(i) The ARP reply can be performed at a high speed.
(ii) Logic of hardware can be simplified.
(iii) Use of a packet buffer is unnecessary.
(iv) Scale of hardware can be reduced.

BRIEF DESCRIPTION OF THE DRAWINGS

The preferred embodiments according to the invention will be explained below referring to the drawings, wherein:

FIGS. 5A to 5F are schematic format diagrams showing a frame and an internal packet in respective sections of the circuit in FIG. 4;

DESCRIPTION OF THE PREFERRED EMBODIMENT

First Embodiment

A first preferred embodiment according to the invention will be described below.

An ARP reply communication apparatus in the first embodiment of the invention is operated such that all ARP reply procedures are performed by ARP-reply-procedure-only hardware not by a CPU, although processes related to protocols of layer 3 and higher layers are executed by software as in the communication apparatus described above.

ARP Reply Procedures

The ARP reply procedures of the invention will be described below.

1. HW; All frames on which ARP packets arriving at a PHY are mounted are received by broadcasting. However, an ARP packet is not forwarded to a CPU.

2. HW; An ARP packet is detected on the basis of type fields in Ethernet header of the received frames on which the ARP packets are mounted.

3. HW; An ARP request packet is detected on the basis of an operation field in the detected ARP packet.

4. HW; It is determined whether the detected ARP request packet is addressed to a self-apparatus port on the basis of a destination IP address field in the ARP request packet.

5. HW; When the ARP request packet is not addressed to the self-apparatus port, the ARP request packet is discarded.

6. HW; When the ARP request packet is addressed to the self-apparatus port, an ARP reply packet is overwritten on the ARP request packet (i.e., is replaced).

7. HW; The replaced reply packet is transmitted from a PHY. Since ARP reply packet is arranged at a place where the ARP request packet is originally set in a flow of the internal packet which arrives at the PHY through a packet forwarding, no other packets are not stored.

ARP-Reply-Procedure-Only Hardware

Figure 1:
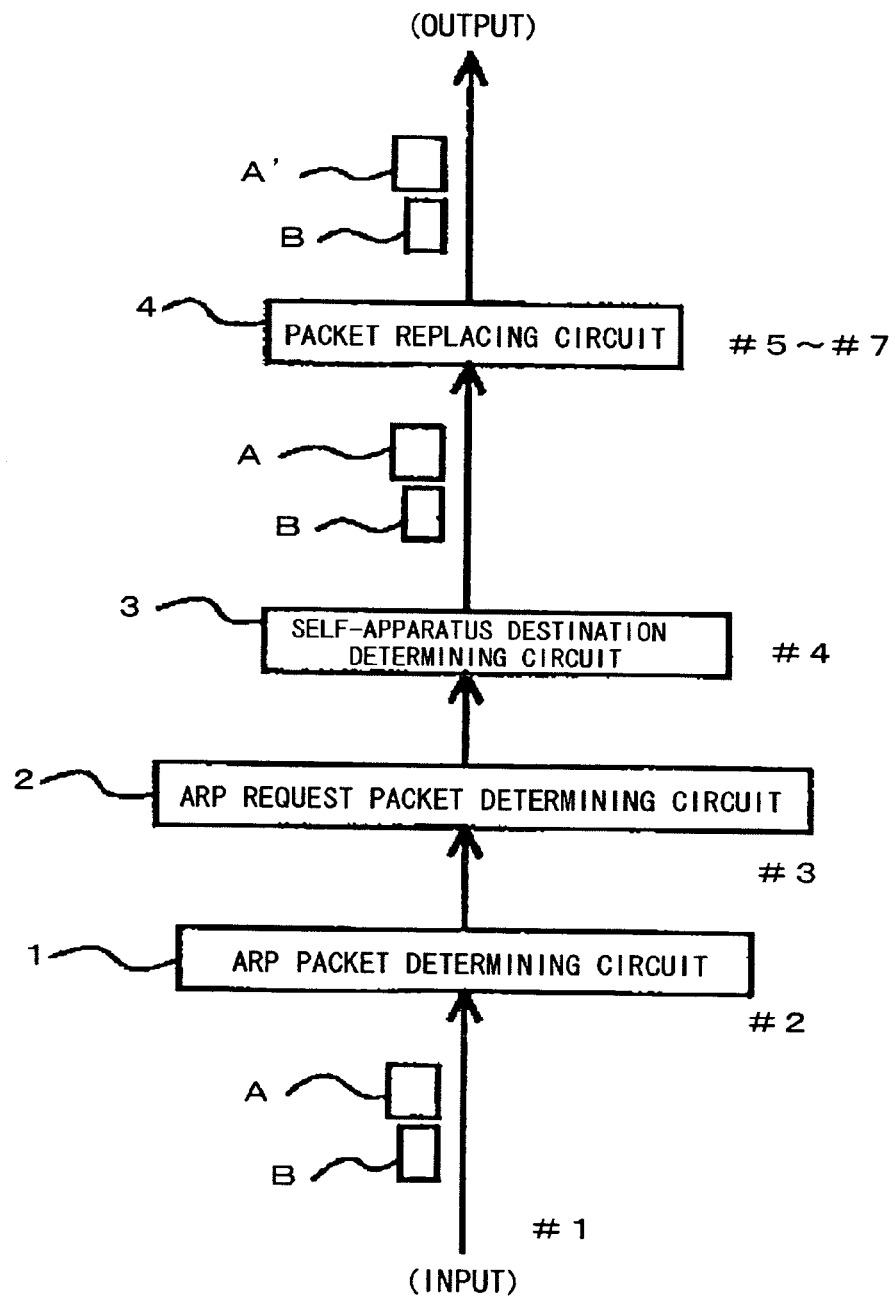
FIG. 1 is a circuit diagram showing a main part of an ARP reply communication apparatus in a preferred embodiment according to the invention.

As shown in FIG. 1, the ARP-reply-procedure-only hardware (constituted by an LSI or an FPGA) installed in the ARP reply communication apparatus of the first embodiment comprises: an ARP packet determining circuit 1 which determines whether an ARP packet is mounted on a frame, based on a type field in an Ethernet header of the frame sent from a line and arrived at a PHY or an MAC (not shown); an ARP request packet determining circuit 2 determines whether the ARP packet is an ARP request packet, based on an operation field in the ARP packet mounted on the frame; a self-apparatus destination determining circuit 3 which checks a destination IP address field in the ARP packet to determines whether the ARP request packet is addressed to the self-apparatus; and a packet replacing circuit 4 which overwrites reply contents on the ARP request packet based on the determination to replace the ARP request packet with an ARP reply packet.

A packet output from the packet replacing circuit 4 is designed to be output to the PHY (not shown).

Figure 8:
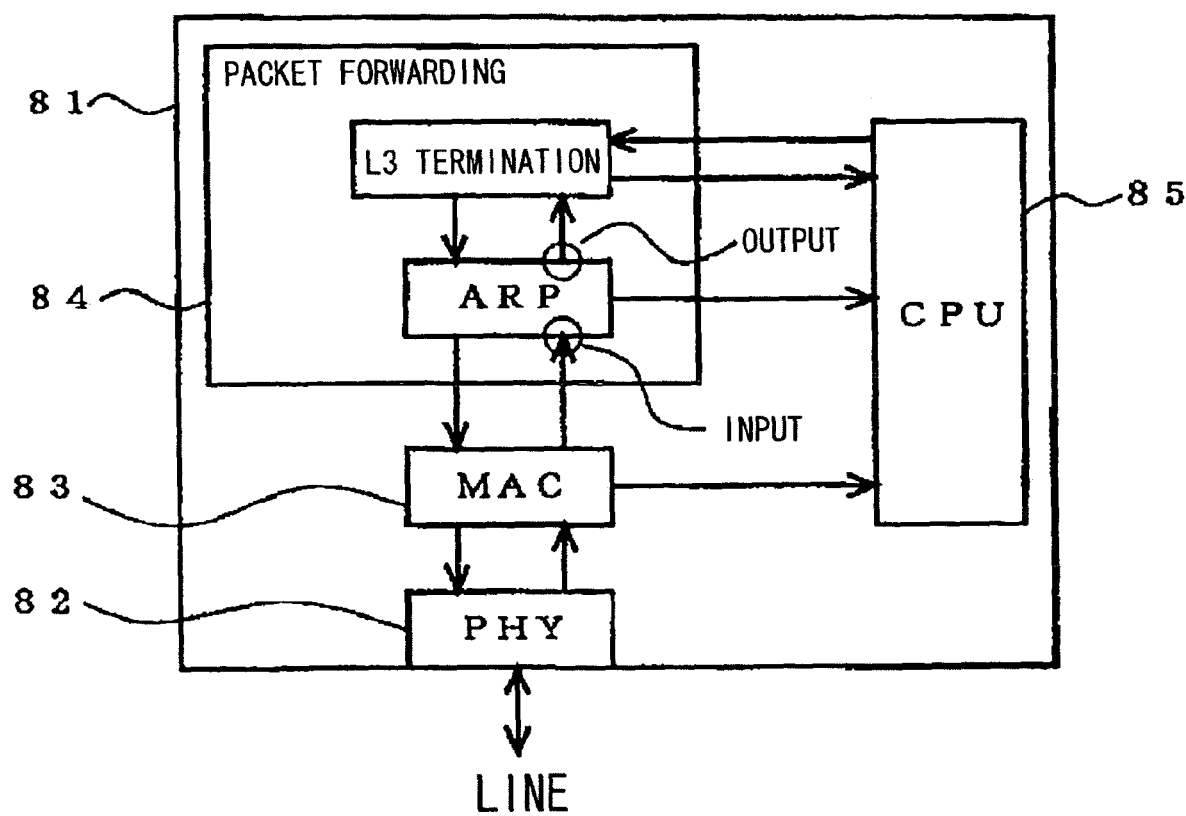
FIG. 8 is a block diagram showing an internal composition of a communication apparatus to which the present invention is applied.

A communication apparatus 81 to which the invention is applied, as shown in FIG. 8, has a PHY 82 which is connected to a line of a network and processes a frame serving as an electronic signal to be input/output by layer 1, a MAC 83 which processes the frame forwarded from the PHY 82 by layer 2, a packet forwarding 84 which performs a layer 3 process with respect to a packet in the frame forwarded from the MAC 83, and a CPU 85. A process performed by the PHY 82 is called an L1 termination, a process performed by the MAC 83 is called an L2 termination, and a process performed by the packet forwarding 84 is called an L3 termination.

The input of the hardware in FIG. 1 corresponds to an input of the ARP connected to the MAC 83 of the communication apparatus 81 as shown in FIG. 8. The output of the hardware in FIG. 1 corresponds to an output of the ARP connected to the L3 termination of the communication apparatus 81 as shown in FIG. 8. In the packet forwarding 84, an internal packet according to the present invention is used.

In FIG. 1, the ARP reply procedures #1 to #6 are appended to the corresponding hardware portions.

ARP Packet-Mounted Frame

Figure 2:
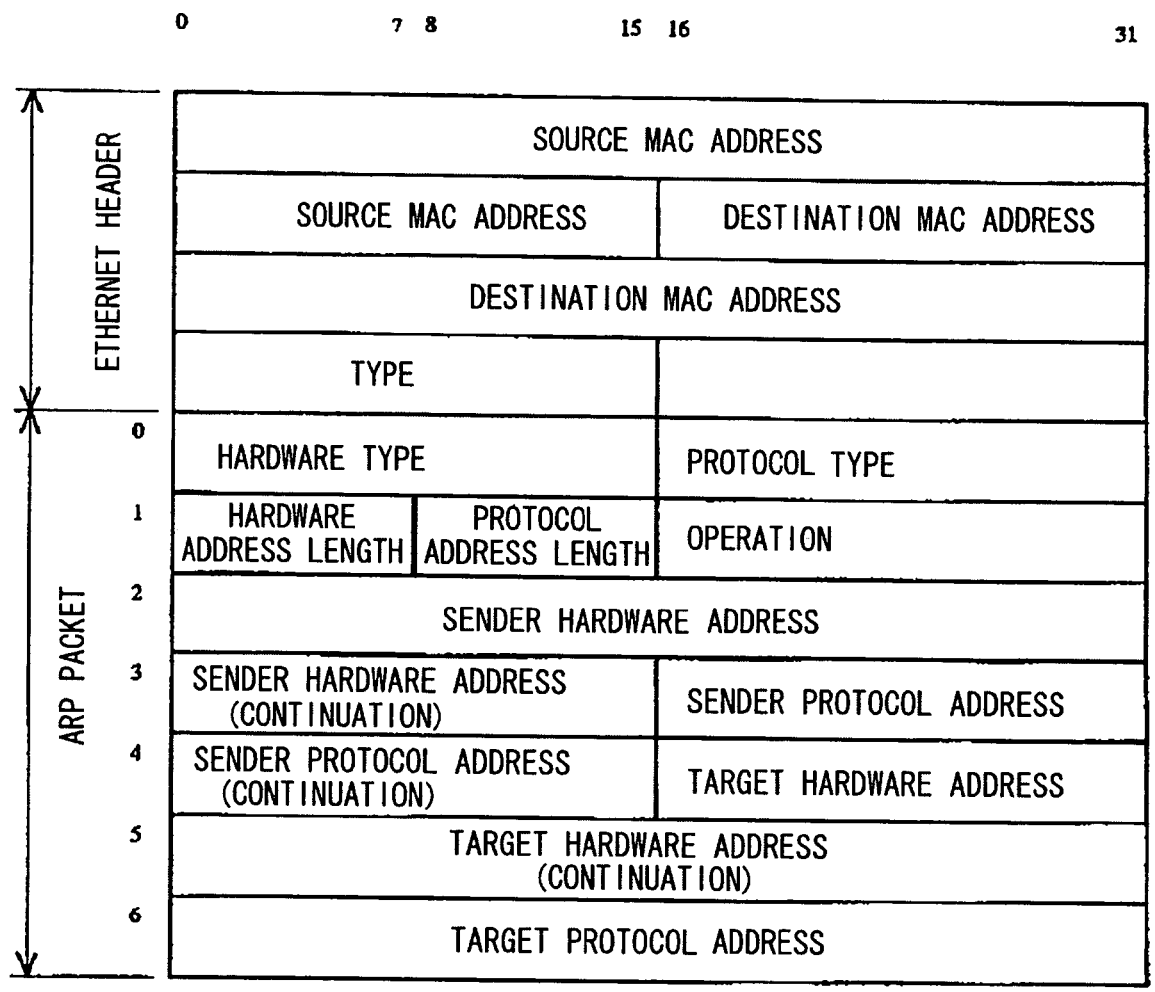
FIG. 2 is a format diagram showing an ARP packet-mounted frame.

FIG. 2 is a format diagram showing an ARP packet-mounted frame.

As shown in FIG. 2, the entire frame can be roughly divided into an Ethernet header and an ARP packet.

The Ethernet header is constituted by a source MAC address field, a destination MAC address field, a type field, and the like, and has a size of 16 bytes as a whole.

The type field is a field in which information representing a type of an upper layer protocol. For example, when an ARP packet is mounted, IP=0x0800, ARP=0x0806, and VLAN=0x8100 are satisfied.

The ARP packet is constituted by a hardware type field, a protocol type field, a hardware address length field, a protocol address length field, an operation field, a sender hardware address (or called a source MAC address) field, a sender protocol address (or called a source IP address) field, a target hardware address (or called a destination MAC address) field, and a target protocol address (or called a destination IP address) field, and has a size of 28 bytes as a whole.

A hardware type field is a field in which information representing a type of a physical medium of a network is stored. For example, a hardware type of a medium of the Ethernet is 0x0001.

The protocol field is a field in which information representing a type of an upper layer protocol handled by an ARP is stored. For example, a type of a protocol of TCP/IP is 0x0800.

The hardware address length field is a field in which a length of a MAC address is stored. For example, since a MAC address in the Ethernet has a size of 6 bytes, 6 is stored in the field.

The protocol address length field is a field in which a length of address information used in an upper layer protocol is stored. For example, since an IP address in the protocol of version 4 has 4 bytes, 4 is stored in the field.

The operation field is a field in which a code to discriminate an ARP request, an ARP reply, an RARP request, and an RARP reply from each other is stored. Code=1 expresses the ARP request, and is used by an apparatus which transmits the ARP request at first. Code=2 expresses ARP reply, and is used in responding by an apparatus corresponding to the ARP request. Code=3 expresses the RARP request, and is used by an apparatus which transmits the RARP request. code=4 expresses the RARP reply, and is used in responding by a server (RARP server) which serve the RARP request.

ARP Reply Operation

The operation of the ARP reply communication apparatus will be described below with reference to FIG. 1.

Herein, since various frames arrive at the PHY, a frame on which the ARP request packet is mounted is defined as frame A, and a frame on which another packet is mounted is defined as frame B.

When frame A arrives at the PHY, frame A is input to the ARP packet determining circuit 1. In the ARP packet determining circuit 1, a type field in the Ethernet header is checked to determine frame A as a frame on which the ARP packet is mounted.

In the ARP request packet determining circuit 2, an operation field in the ARP packet mounted on frame A is checked to determine that the ARP packet mounted on frame A as an ARP request packet.

In the self-apparatus destination determining circuit 3, a designation IP address field in the ARP packet mounted on frame A is compared with an IP address of a self-apparatus port to determine that frame A mounts an ARP request packet addressed to the self-apparatus. As a result, an event in which the ARP request packet arrives at the self-apparatus is determined.

In the packet replacing circuit 4, on the basis of the determination, information required for a reply to the ARP request packet mounted on frame A is overwritten on the ARP request packet to replace frame A with frame A' on which the ARP reply packet is mounted.

Frame A' on which the ARP reply packet output from the packet replacing circuit 4 is sent to the PHY through the MAC and transmitted to the line.

Even though frame A mounts the ARP request packet, when the ARP request packet is addressed to another apparatus, an IP address stored in the destination IP address field is compared with a self-apparatus port IP address in the self-apparatus destination determining circuit 3 to determine that the ARP request packet mounted on frame A is not a packet addressed to the self-apparatus. In this manner, in the packet replacing circuit 4, frame A is discarded.

When frame B arrives at the PHY, frame B is input to the ARP packet determining circuit 1. In the ARP packet determining circuit 1, a type field in an Ethernet header of frame B is checked to determine that frame B is not a frame on which the ARP packet is mounted.

In the ARP request packet determining circuit 2, the self-apparatus destination determining circuit 3, and the packet replacing circuit 4, frame B is not processed at all. Therefore, when frame B mounts a normal IP packet, frame B is L3-terminated, sent to the PHY through the MAC, and transmitted to the line.

COMPARATIVE EXAMPLE

Figure 3:
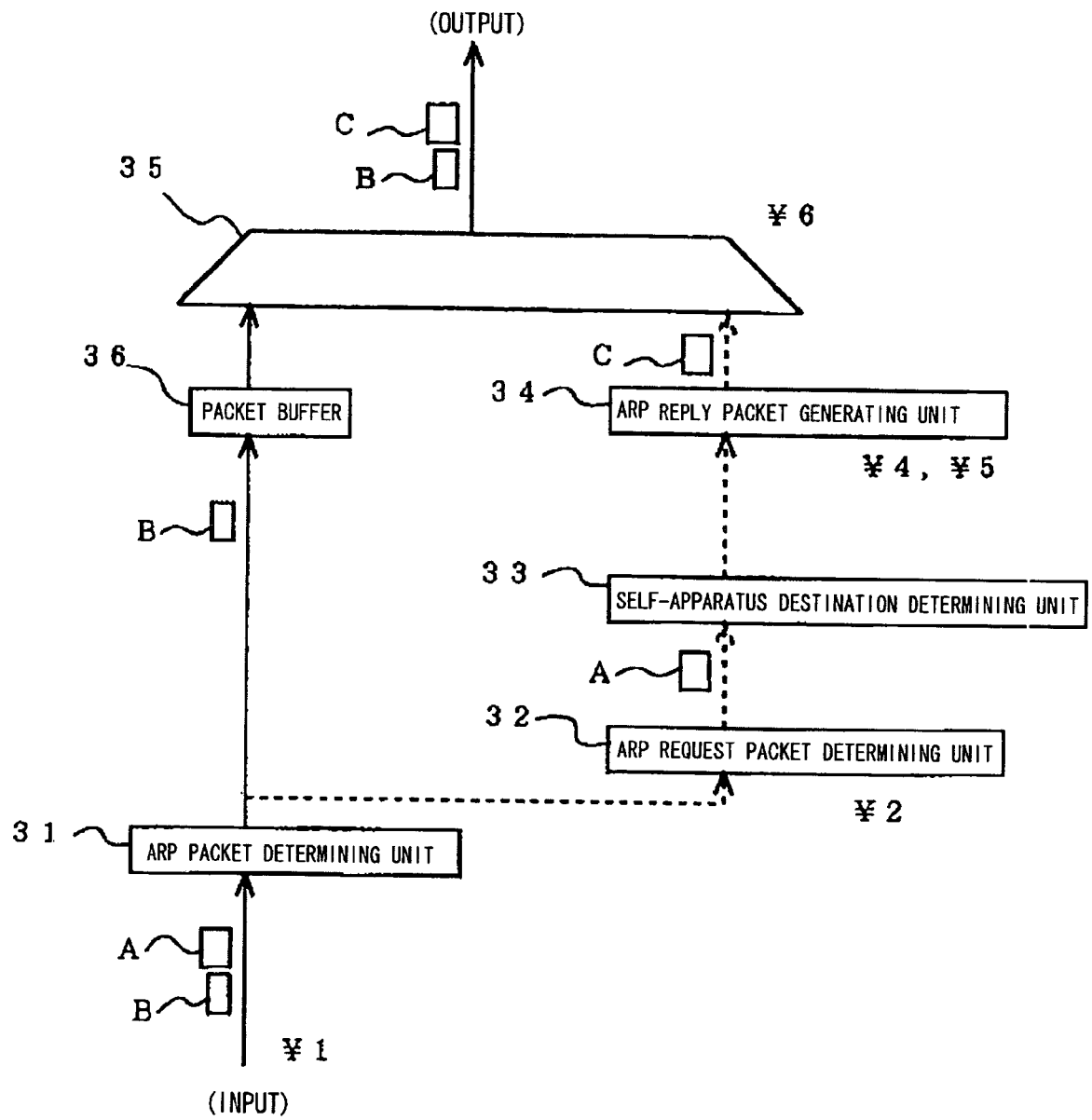
FIG. 3 is a hybrid block diagram showing a conventional communication apparatus.

For comparison, ARP reply procedures are in a conventional communication apparatus are shown in FIG. 3 as blocks. The communication apparatus has an ARP packet determining unit 31 which determines, on the basis of a type field in an Ethernet header of a frame sent from a line and arriving at a PHY (not shown), that the frame is an ARP-packet-mounted frame to inform a CPU of a determination result, an ARP request packet determining unit 32 which determines that the frame forwarded to the CPU is the ARP-packet-mounted frame, a self-apparatus destination determining unit 33 which checks an operation field and a destination IP address in the ARP request packet mounted on the frame is addressed to the self-apparatus, an ARP reply packet generating unit 34 which generate, on the basis of the determination, a frame on which an ARP reply packet is mounted to discard the ARP request packet-mounted frame, a multiplex circuit 35 to insert the ARP reply into a flow of the frame in the line, and a packet buffer 36 which temporarily stores other frames.

A communication apparatus in FIG. 3 is obtained by combining hardware and software. A flow of processes indicated by a solid line is performed by the hardware, and a flow of processes indicated by a dotted line is performed by the software. If a communication apparatus in which the software processes are entirely replaced with the hardware processes is constituted, it is found that a dotted-line portion is merely changed into a sold-line portion not to constitute the structure in FIG. 1.

Effects of the First Embodiment

In the present invention, since all the ARP reply procedures #1 to #7 are executed by the hardware, time required for the ARP reply procedures #1 to #7 is in a nano-second order. In the conventional art, since the ARP reply procedures ¥2 to ¥5 are executed by the software, time required for the ARP reply procedures ¥2 to ¥5 is in a micro-second order. In the present invention, the process of temporarily storing a frame is not required in the ARP reply procedures. Therefore, the following advantages can be obtained. That is, a large-capacity packet buffer is not necessary, a logic of hardware can be simplified, and a scale of hardware can be reduced.

Second Embodiment

A second preferred embodiment according to the invention will be described below.

ARP-reply-procedure-only Hardware

Figure 4:
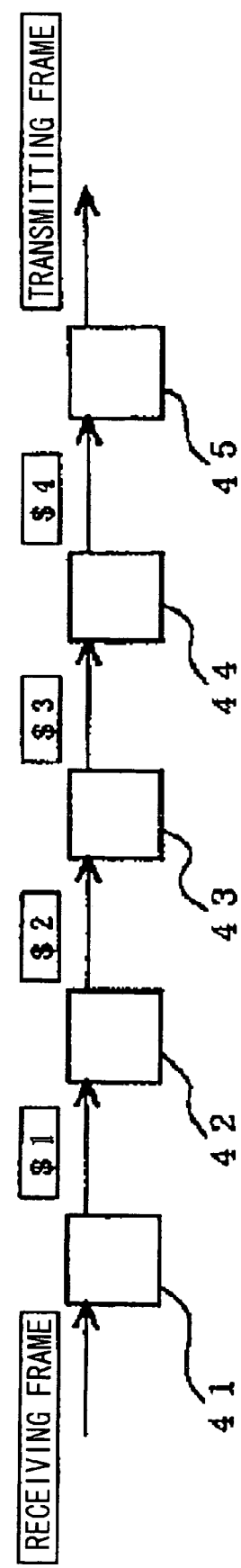
FIG. 4 is a circuit diagram showing a main part of an ARP reply communication apparatus in another preferred embodiment according to the invention.

As shown in FIG. 4, an ARP-reply-procedure-only hardware installed in an ARP reply communication apparatus of the second embodiment comprises: an ARP packet determining circuit 41; an ARP request packet determining circuit 42; a self-apparatus destination determining circuit 43; a packet replacing circuit 44; and an internal header deleting circuit 45.

The ARP packet determining circuit 41 is the same as the ARP packet determining circuit 1 explained in FIG. 1, and includes an internal header adding circuit which adds internal headers to all arriving frames to constitute an internal packet and an ARP packet receiving marking circuit which sets an ARP packet receiving flag of the internal header when a type field in an Ethernet header of the internal packet is an ARP packet.

The internal packet is defined with respect to the present invention. As will be described later in detail, the internal packet is available in only the communication apparatus, and does not go out of the communication apparatus.

Check items in the ARP packet determining circuit 41 are a DA field=ff : ff : ff : ff : ff : ff (broadcast) and a type field=0×0806 (ARP).

The ARP request packet determining circuit 42 is the same as the ARP request packet determining circuit 2 explained in FIG. 1, includes an ARP request packet receiving marking circuit which sets an ARP request packet receiving flag of the internal header when an operation field in the ARP packet of the internal packet is an ARP request packet.

Check items in the ARP request packet determining circuit 42 are a hardware type field=0×001 in the ARP packet of the internal packet, a protocol field=0x0800, a hardware address length field=0x006, a protocol address length field=0x04, and an operation field=0x0001.

The self-apparatus destination determining circuit 43 is the same as the self-apparatus destination determining circuit 3 explained in FIG. 1, and includes an ARP processing execution designating marking circuit which sets an ARP processing execution designating flag of the internal header when a destination IP address field in the ARP packet of the internal packet is an IP address of a self-apparatus port.

A check item in the self-apparatus destination determining circuit 43 is a destination IP address field (in the ARP packet of the internal packet)=a self-apparatus port IP address.

The packet replacing circuit 44 is the same as the packet replacing circuit 4 explained in FIG. 1 and includes an address overwriting circuit which replaces the destination IP address field in the ARP request packet of the internal packet with a source IP address field when the ARP packet receiving flag, the ARP request packet receiving flag, and the ARP processing execution designating flag are set in the internal header of the internal packet and replaces the destination MAC address field with a source MAC address field to overwrite a MAC address of the self-apparatus on a source MAC address field.

The internal header deleting circuit 45 deletes the internal header from the internal packet to constitute a transmitting frame.

ARP Reply Operation

In the ARP reply communication apparatus in FIG. 4, the internal packet is processed in the order of the operation, where symbols $1 to $4 are appended. The internal packets $1 to $4 and schematic formats of a receiving frame and a transmitting frame are shown in FIGS. 5A to 5F. The operation will be described below with reference to FIG. 4 and FIGS. 5A to 5F.

A receiving frame arriving at the PHY, as shown in FIG. 5A, is constituted by an Ethernet header 51 and an ARP packet 52 or an Ethernet header 51, an IP header 52, and data 53.

Figure 6:
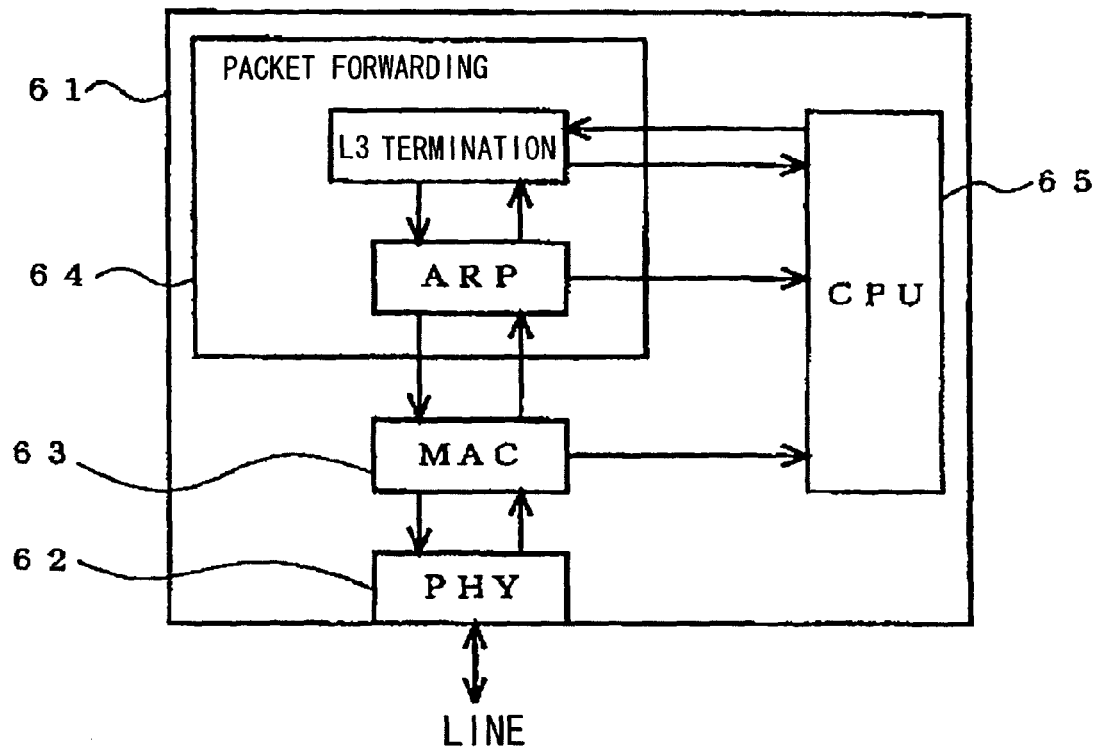
FIG. 6 is a block diagram an internal composition of a general communication apparatus.
Figure 7:
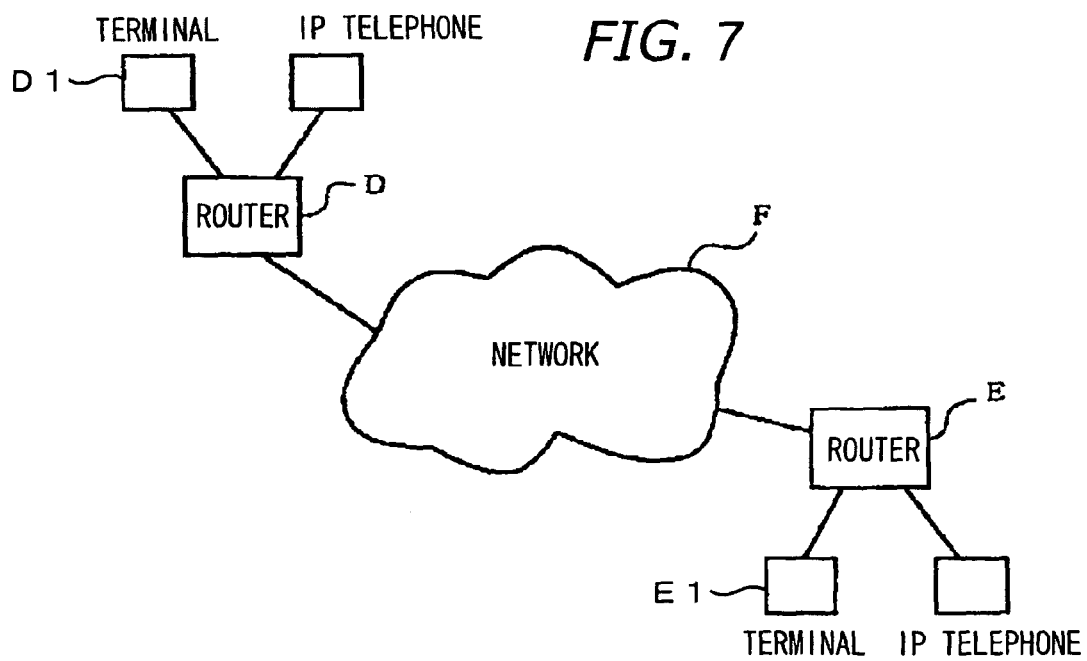
FIG. 7 is a diagram showing a network to which the communication apparatus in FIG. 6 is connected.

The ARP packet determining circuit 41, as shown in FIG. 5B, adds an internal header 54 to all arriving frames to constitute an internal packet $1 and checks the Ethernet header 51 of the internal packet $1 to understand that the internal packet $1 mounts an ARP packet. In this case, the ARP packet determining circuit 41 sets an ARP packet receiving flag (expressed as ARP receiving in FIG. 5) in an internal header 54. An internal packet in which the ARP packet receiving flag is not set is not processed by the subsequent circuit in FIG. 4 at all. In circuits and software subsequent to the circuit in FIG. 4 (See FIG. 8), as in the conventional art (FIG. 6), the packet is subjected to a normal routing/switching process and directly serves as a transmitting frame. More specifically, the internal header 54 operates to select a process to be started for the subsequent circuit.

The internal packet $1 outputted from the ARP packet determining circuit 41, as shown in FIG. 5B, has the internal header 54 arranged in front of the Ethernet header 51. The internal header 54 is provided with a plurality of columns to set flags. The flags are a destination-solved flag, an ARP reply process execution designating flag (expressed as ARP processing in FIGS. 5A to 5F), an ARP request packet receiving flag (expressed as ARP request receiving in FIGS. 5A to 5F), and the like. The meanings of these flags will be described in a flow of the operation.

In the internal packet $1, the ARP packet receiving flag is set ("set" is indicated by a black point in FIGS. 5A to 5F, and other flags are reset.

In the ARP request packet determining circuit 42, an ARP packet receiving flag of the internal header 54 is set. When a packet is determined as an ARP request packet, the ARP request packet receiving flag is set. Therefore, the internal packet $1 changes into an internal packet $2 as shown in FIG. 5C, and the internal packet $2 is output from the ARP request packet determining circuit 42.

When the ARP packet receiving flag and the ARP request packet receiving flag are set in the internal header 54 of the internal packet $2, the self-apparatus destination determining circuit 43 starts a process related to the ARP request packet and checks a destination IP address field in the ARP packet 52 of the internal packet $2. When the destination IP address field is a self-apparatus port IP address, it is understood that an ARP request packet comes to the self-apparatus. For this reason, the ARP reply process execution designating flag of the internal header 54 is set. In this manner, the internal packet $2 is processed into an internal packet $3 as shown in FIG. 5D.

In the internal packet $3 output from the self-apparatus destination determining circuit 43, the destination-solved flag is not set and the ARP reply process execution designating flag is set in the internal header 54. The destination-solved flag means that a transmitting port is determined in the ARP reply communication apparatus and the packet need not be processed.

The packet replacing circuit 44 starts a process related to the ARP request packet because the ARP packet receiving flag, the ARP request packet receiving flag, and the ARP reply process execution designating flag are set and the destination-solved flag is not set in the internal header 54. The packet replacing circuit 44 writes a self-apparatus port IP address in a source IP address field in the ARP packet 52 of the internal packet $3, writes a self-apparatus port MAC address in a source MAC address field, writes an IP address of an apparatus which transmits an ARP request packet to a destination IP address field, writes a MAC address of the apparatus which transmits an ARP request packet to a destination MAC address field, and rewrites an operation field in the ARP packet 52 into an ARP reply. At the same time, the packet replacing circuit 44 also rewrites a destination MAC address field and a source MAC address field in the Ethernet header 51 and determines a transmitting port.

The packet replacing circuit 44 executes packet replacement which overwrites an ARP reply packet on the ARP request packet, and writes information representing the completion of the execution in the internal header 54. More specifically, the destination-solved flag is set. As a result, the internal packet $3 is changed into an internal packet $4 as shown in FIG. 5E.

In the internal packet $4 outputted from the packet replacing circuit 44, the destination-solved flag is set in the internal header 54. Since the destination-solved flag is set, the internal header deleting circuit 45 deletes the internal header 54 from the internal packet $4 to constitute an ARP-reply-packet-mounted transmitting frame. When the destination-solved flag is not set (it is impossible in reception of an ARP packet), a DA in the Ethernet header is rewritten with a broadcast, and the internal header 54 is deleted from the internal packet $4 to constitute a designation-unsolved transmitting frame.

The transmitting frame outputted from the internal header deleting circuit 45 is transmitted from the ARP reply communication apparatus according to the present invention through the MAC to the PHY.

In the above explanation, operations about three flags, i.e., an IP relay process flag, a CPU forwarding process, and a discarding process flag are omitted. However, these flags are prepared, and various processing circuits corresponding to the flags are incorporated in the hardware in FIG. 4, so that functional extension can be achieved.

As described above, in the ARP reply communication apparatus in FIG. 4, a circuit which checks the contents of a frame does not directly reflect a check result on processing of frame But sets a flag which designates a subsequent circuit which processes a frame to perform frame processing. Such an operation of setting a flag is called marking.

On the other hand, the circuit which processes a frame does not concern checking of the contents of frame And performs only an operation according to flags. In this manner, the process of transmitting the flags to the subsequent stage to perform processing corresponding to the flags is called a pipeline process.

Transmission of a flag is not performed through a special signal line. An internal header is added to the head of frame And a column for setting a flag is arranged in the internal header, so that the flag is transmitted to the subsequent stage together with the frame.

Application of the invention

The present invention is based on the following knowledge. That is, since the ARP request packet has a packet length equal to that of the ARP reply packet, when the content of the ARP request packet is rewritten, replaced with the ARP reply packet, and output, the ARP-reply-packet-mounted frame is arranged at a place where the ARP-request-packet-mounted frame is originally set in a flow of the frame on the line connected to the port. For this reason, a space for arranging a newly generated ARP-reply-packet-mounted frame which is newly generated by temporarily storing another frame need not be formed. In this manner, in a protocol which causes another communication apparatus to return a reply packet or a reply frame (to be referred to as a packet/frame as a meaning of a packet or a frame) to not only an ARP packet but also a request packet or a request frame output from a certain communication apparatus, when the request packet/frame has a packet/frame length equal to that of the reply packet/frame, or when the reply packet/frame has a shorter packet/frame length, the present invention can be applied.

More specifically, although responding processes are different in the details of protocols, the protocol reply communication apparatus which performs these processes by hardware, rewrites the contents of a request packet/frame, and replaces the request packet/frame with a reply packet/frame to output the reply packet/frame is constituted. In this case, malfunction or deterioration of function can be advantageously prevented even in an environment in which a request packet/frame is frequently generated. For example, the following configuration is preferably employed. That is, a process (pinging) of transmitting an echo reply packet in reply to an echo request packet in ICMP (Internet Control Message Protocol: RFC792) is constituted by hardware, and the echo request packet is rewritten in contents and replaced with an echo reply packet to transmit the echo reply packet.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A reply communication apparatus which conforms to a protocol to return a reply electronic document in reply to a request electronic document sent from a communication apparatus, comprising:

a protocol electronic document determining circuit to determine whether a protocol electronic document is mounted on an electronic document sent through a transmitting path and arriving at a port of the apparatus;

a request electronic document determining circuit to, when it is determined that the protocol electronic document is mounted on the electronic document, determine whether the protocol electronic document comprises a request electronic document;

a self-apparatus destination determining circuit to, when it is determined that the protocol electronic document comprises the request electronic document, determine whether the request electronic document is addressed to the self-apparatus; and an electronic document replacing circuit to, when it is determined that the request electronic document is addressed to the self-apparatus, overwrite response contents on the request electronic document to replace the request electronic document with a reply electronic document, wherein the protocol electronic document determining circuit, the request electronic determining circuit, the self-apparatus destination determining circuit, and the electronic document replacing circuit comprises a protocol reply procedure hardware, wherein the protocol electronic determining circuit comprises an internal header adding circuit to add an internal header to each arriving frame to produce an internal electronic document, and a protocol electronic document receiving marking circuit to set a protocol electronic document receiving flag of the internal header when the electronic document comprises a protocol electronic document;

wherein the request electronic document determining circuit comprises a request electronic document receiving marking circuit to set a request electronic document receiving flag of the internal header when the request electronic document comprises a request electronic document;

wherein the self-apparatus destination determining circuit comprises a protocol processing execution designating marking circuit to set a protocol processing execution designating flag of the internal header when the request electronic document is addressed to the self-apparatus, wherein the electronic document replacing circuit comprises an address overwriting circuit to, when the protocol electronic document receiving flag, the request electronic document receiving flag and the protocol processing execution designating flag are set in the internal header of the internal electronic document, replace the destination address field in the request electronic document of the internal electronic document with a source address field, and overwrite an address of the self-apparatus on the source address field, and wherein the apparatus further comprises an internal header deleting circuit to delete the internal header from the internal electronic document to produce a transmitting electronic document.

2. An Address Resolution Protocol (ARP) reply communication apparatus, comprising:

an ARP packet determining circuit to determine whether an ARP packet is mounted on a frame based on a type field in an Ethernet header of the frame sent through a line and arriving at a port of the apparatus;

an ARP request packet determining circuit to, when it is determined that the ARP packet is mounted on the frame, determine whether the ARP packet comprises an ARP request packet based on an operation field in the ARP packet;

a self-apparatus destination determining circuit to, when it is determined that the ARP packet comprises the ARP request packet, check a destination IP address field in the ARP request packet to determine whether the ARP request packet is addressed to the self-apparatus; and a packet replacing circuit to, when it is determined that the ARP request packet is addressed to the self-apparatus, overwrite reply contents on the ARP request packet to replace the ARP request packet with an ARP reply packet, wherein:

the ARP packet determining circuit, the ARP request packet determining circuit, the self-apparatus destination determining circuit, and the packet replacing circuit comprises an ARP reply procedure hardware;

the ARP packet determining circuit comprises an internal header adding circuit to add an internal header to each arriving frame to produce an internal packet, and an ARP packet receiving marking circuit to set an ARP packet receiving flag of the internal header when a type field in an Ethernet header of the internal packet comprises an ARP packet;

the ARP request packet determining circuit comprises an ARP request packet receiving marking circuit to set an ARP request packet receiving flag of the internal header when a type field in the ARP packet of the internal packet comprises an ARP request packet;

the self-apparatus destination determining circuit comprises an ARP processing execution designating marking circuit to set an ARP processing execution designating flag of the internal header when a destination IP address field in the ARP packet of the internal packet comprises an IP address of a self-apparatus port;

the packet replacing circuit comprises an address overwriting circuit to, when the ARP packet receiving flag, the ARP request packet receiving flag and the ARP processing execution designating flag are set in the internal header of the internal packet, replace the destination IP address field in the ARP request packet of the internal packet with a source IP address field, replace a destination MAC address field with a source MAC address field, and overwrite a MAC address of the self-apparatus on the source MAC address field; and the apparatus further comprises an internal header deleting circuit to delete the internal header from the internal packet to produce a transmitting frame.

3. The reply communication apparatus according to claim 1, wherein the request electronic document is transmitted together with other documents, and the request electronic document and the other documents are processed in series through a single route.

4. The reply communication apparatus according to claim 1, wherein the request electronic document comprises a request packet and the reply electronic document comprises a reply packet, wherein a length of the reply packet is equal to or shorter than a length of the request packet.

5. The reply communication apparatus according to claim 1, wherein the protocol electronic document determining circuit, the request electronic document determining circuit, and the electronic document replacing circuit are arranged in series, and the request electronic document and the other electronic documents are successively processed in the protocol electronic document determining circuit, the request electronic document determining circuit, and the electronic document replacing circuit.

6. The reply communication apparatus according to claim 5, wherein the self-apparatus destination determining circuit is arranged between the request electronic document determining circuit and the electronic document replacing circuit.

7. The reply communication apparatus according to claim 1, wherein a length of the reply electronic document is equal to or shorter than a length of the request electronic document.

8. The Address Resolution Protocol (ARP) reply communication apparatus according to claim 2, wherein the internal header comprises a flag region for the ARP packet receiving flag, the ARP request packet receiving flag, and the ARP processing execution designating flag.

* * * * *